(12) United States Patent
Hitchcock et al.

(10) Patent No.: US 9,942,257 B1
(45) Date of Patent: Apr. 10, 2018

(54) TRUSTWORTHY INDICATION OF SOFTWARE INTEGRITY

(75) Inventors: Daniel W. Hitchcock, Bothell, WA (US); Darren E. Canavor, Redmond, WA (US); Jesper M. Johansson, Redmond, WA (US); Bharath Kumar Bhimanaik, Bellevue, WA (US); Andrew J. Roths, Kenmore, WA (US)

(73) Assignee: Amazon Technologies, Inc., Reno, NV (US)

( * ) Notice: Subject to any disclaimer, the term of this patent is extended or adjusted under 35 U.S.C. 154(b) by 201 days.

(21) Appl. No.: 13/546,626

(22) Filed: Jul. 11, 2012

(51) Int. Cl.
*G06F 11/00* (2006.01)
*H04L 29/06* (2006.01)
*G06F 21/57* (2013.01)

(52) U.S. Cl.
CPC .......... *H04L 63/1433* (2013.01); *G06F 21/57* (2013.01)

(58) Field of Classification Search
CPC .............................. H04L 63/1433; G06F 21/57
See application file for complete search history.

(56) References Cited

U.S. PATENT DOCUMENTS

| 8,572,403 | B2* | 10/2013 | Beaumont | G06F 21/84 713/189 |
| 2004/0153644 | A1* | 8/2004 | McCorkendale | G06F 21/33 713/156 |
| 2005/0022034 | A1* | 1/2005 | Chaudhari | G06F 21/32 726/19 |
| 2005/0166064 | A1* | 7/2005 | Dive-Reclus | G06F 21/6281 713/189 |
| 2006/0026676 | A1 | 2/2006 | O'Donoghue | |
| 2006/0090192 | A1* | 4/2006 | Corby | G06F 21/51 726/1 |
| 2006/0100010 | A1* | 5/2006 | Gatto | A63F 13/12 463/29 |

(Continued)

OTHER PUBLICATIONS

Wikipedia article entitled "Trusted Platform Module", 6 pps. [online] [retrieved on Jul. 11, 2012] retrieved from http://en.wikipedia.org/wiki/Trusied_Platform_Module.

(Continued)

*Primary Examiner* — Khoi Le
(74) *Attorney, Agent, or Firm* — Lee & Hayes, PLLC

(57) ABSTRACT

Computing devices are disclosed that include functionality for providing a trustworthy indication of software integrity. The computing devices include a hardware trust evaluation device capable of determining the trustworthiness of computer programs executing on the device. At least one trust indicator is also connected to the hardware trust evaluation device for providing an external indication of the trustworthiness of a computer program. If the hardware trust evaluation device determines that a program is trustworthy, the trust evaluation device causes the trust indicator to provide a positive indication of the trustworthiness of the computer program to a user of the computing device. If the hardware trust evaluation device determines that a program is not trustworthy, the trust evaluation device causes the trust indicator to provide a negative indication of the trustworthiness of the computer program. Certain functionality might also be restricted in response to determining that a program is not trustworthy.

26 Claims, 8 Drawing Sheets

(56) References Cited

U.S. PATENT DOCUMENTS

| | | | |
|---|---|---|---|
| 2006/0236122 A1* | 10/2006 | Field | G06F 21/575 713/187 |
| 2008/0052698 A1* | 2/2008 | Olson | G06F 8/68 717/168 |
| 2008/0077801 A1* | 3/2008 | Ekberg | G06F 21/554 713/187 |
| 2008/0104669 A1* | 5/2008 | Niemiec | A61B 5/0002 726/2 |
| 2008/0165971 A1* | 7/2008 | de Cesare | G06F 21/575 380/277 |
| 2008/0209215 A1* | 8/2008 | Gao | G06F 21/34 713/169 |
| 2010/0235912 A1* | 9/2010 | Hermann | G06F 21/57 726/23 |
| 2011/0010701 A1* | 1/2011 | Cooper | G06F 21/12 717/175 |
| 2012/0192275 A1* | 7/2012 | Oliver | G06F 21/51 726/24 |
| 2012/0260345 A1* | 10/2012 | Quinn | G06F 21/57 726/26 |
| 2014/0173738 A1 | 6/2014 | Condry et al. | |
| 2014/0344936 A1 | 11/2014 | Thario | |
| 2015/0074764 A1 | 3/2015 | Stern | |
| 2015/0113654 A1 | 4/2015 | Lymer et al. | |
| 2015/0234757 A1 | 8/2015 | You et al. | |
| 2015/0358356 A1 | 12/2015 | Diaz-Tellez et al. | |
| 2016/0156593 A1 | 6/2016 | Yan | |
| 2016/0261609 A1 | 9/2016 | Derman et al. | |

OTHER PUBLICATIONS

Office action for U.S. Appl. No. 14/810,275, dated Nov. 16, 2016, Hitchcock et al., "Trustworthy Indication of Software Integrity", 24 pages.

\* cited by examiner

TRUSTWORTHY INDICATION OF SOFTWARE INTEGRITY

BACKGROUND

A variety of technical mechanisms exist today for measuring and validating the source and integrity of program code executing on a computing device. Conveying the results of this type of validation is, however, ultimately dependent upon displaying an on-screen message to a user of the computing device.

Conveying validation results on-screen is inherently fallible in that any user interface elements indicating that program code has been verified and is trustworthy can be imitated and rendered by malicious program code executing on the computing device. As a consequence, users might unknowingly permit the execution of compromised program code.

It is with respect to these and other considerations that the disclosure made herein is presented.

DETAILED DESCRIPTION

Figure 1:
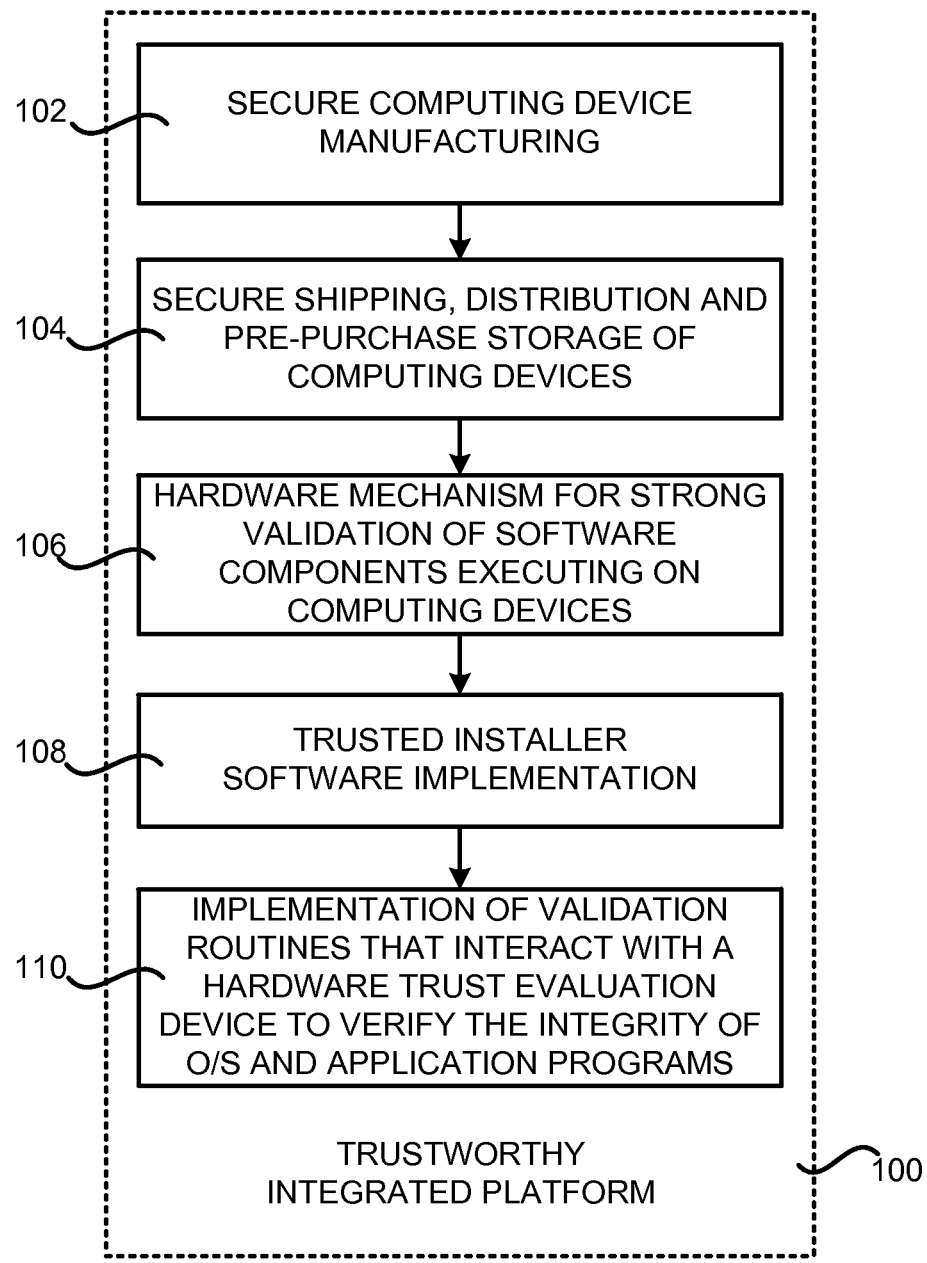
FIG. 1 is a block diagram showing aspects of a trustworthy integrated platform that provides one operating environment for the various embodiments disclosed herein.

The following detailed description is directed to technologies for providing a trustworthy indication of software integrity. Through an implementation of the concepts and technologies disclosed herein, an indication of the integrity of software executing on a computing device can be provided to a user of the computing device in a manner that is highly resilient to imitation attacks. Because the mechanisms described herein are more resilient to imitation attacks than on-screen indications, the indications provided utilizing the disclosed mechanisms may be more trustworthy than typical on-screen indications regarding the integrity of executing software.

According to one embodiment disclosed herein, a computing device is configured with a hardware trust evaluation device, such as a Trusted Platform Module ("TPM"). The hardware trust evaluation device is a hardware device that includes functionality for validating the integrity of program code executing on the computing device, such as an operating system, application programs, and device drivers. The integrity of a program may be validated, for instance, by determining that the program is unmodified from the version created by its developer. The integrity of a program might also be determined by verifying that a program was authored by a trusted developer. In this instance, a computer program might contain a mechanism to identify its author. Other mechanisms might also be utilized to verify the integrity of a program. Additionally, a user, administrator, or other entity might define what it means for a program to be trustworthy. This definition might be periodically changed and/or updated. A computer program that has had its integrity verified is referred to herein as a "trustworthy" program. The hardware trust evaluation device might utilize various mechanisms to determine whether a computer program is trustworthy.

The computing devices disclosed herein are configured with a trust indicator that is integrated with or connected directly to the hardware trust evaluation device. In one embodiment, for instance, the trust indicator is a light such as a light-emitting diode ("LED"), which is soldered directly to the hardware trust evaluation device and visible on an exterior surface of a case of the computing device. In other embodiments, the trust indicator is a display, speaker, buzzer, or other type of device through which a user-consumable signal indicating the trustworthiness of a computer program can be provided to a user of the computing device. The trust indicator is configured in a manner likely to minimize the possibility that indications provided by the trust indicator can be imitated by malicious program code executing on the computing device. The trust indicator is physically separated from the main display of the device, if the device has such a display. The trust indicator may also be configured with an input mechanism through which the user can make a choice regarding whether to permit execution of some piece of software, or it may utilize existing input mechanisms on the device but provide the user with assurance that the user's intended input reached the hardware trust evaluation device.

The computing devices disclosed herein might also be configured to cause the hardware trust evaluation device to evaluate the trustworthiness of a computer program executing on the computing device. For example, the hardware trust evaluation device may evaluate the trustworthiness of an application program when the application program is executed in the foreground on the computing device. In other embodiments, the hardware trust evaluation device may evaluate the trustworthiness of a driver program, such as a device driver for supporting the operation of a peripheral when the peripheral is connected to the computing device. The computing device might also be configured to cause the hardware trust evaluation device to evaluate the trustworthiness of other types of computer programs at other times.

If the hardware trust evaluation device determines that a computer program is trustworthy, the hardware trust evaluation device causes the trust indicator to provide a positive indication of the trustworthiness of the computer program. For example, in an embodiment where the trust indicator is an LED capable of illuminating in multiple colors, the hardware trust evaluation device might cause the LED to illuminate in green to provide a user of the computing device an indication that the computer program is trustworthy. Other types of positive indications of the trustworthiness of a computer program might also be provided.

If the hardware trust evaluation device determines that a computer program is not trustworthy, the hardware trust evaluation device causes the trust indicator to provide a negative indication of the trustworthiness of the computer program. For instance, in an embodiment where the trust indicator is an LED capable of illuminating in multiple colors, the hardware trust evaluation device might cause the LED to illuminate in red to provide a user of the computing device an indication that the computer program is not trustworthy. Other types of negative indications of the trustworthiness of a computer program might also be provided.

If the trust indicator is not capable of telling the user which specific computer program it is indicating it can rely on a primary display on the computing device to do so. The hardware trust evaluation device may have its own program on the computing device, which shows, in the foreground in a secure execution mode, a list of programs currently executing, allowing the user to choose one of them, in response to which choice the trust indicator indicates the trustworthiness of this program. The trust indicator may have a special indication mode when the hardware trust evaluation device program is executing. In an embodiment where the trust indicator is an LED, the hardware trust evaluation device might cause the LED to blink in a predefined sequence to indicate that the hardware trust evaluation device's special program should now be executing in the foreground. In another embodiment, the trust indicator might be utilized to provide an indication of the source of an executing program.

According to other embodiments, the computing device is also configured to restrict functionality of a computer program and/or the computing device in response to determining that a computer program on the device is not trustworthy. For example, the computing device might permanently or temporarily disable or restrict access to hardware components of the computing device, restrict access to application programming interfaces ("APIs"), remove data from the computing device, terminate the execution of the computer program, or entirely disable the computing device in response to determining that a computer program executing on the device is not trustworthy. Other types of functionality might also be restricted in response to identifying a computer program that is not trustworthy.

In other embodiments, the computing device is also configured to enable additional functionality in response to determining that a computer program on the device is trustworthy. For example, the computing device might take certain actions, such as providing a password or other type of credentials on behalf of the user, if an application program is deemed to be trustworthy. Other types of actions might also be performed in response to determining that a computer program executing on the computing device is trustworthy.

It should be appreciated that the embodiments disclosed herein might be utilized with any type of computer, computing system, computing device, application program, operating system, or other type of system or component. Accordingly, although the embodiments disclosed herein are primarily presented in the context of a computing device that embodies the concepts disclosed herein for providing a trustworthy indication of software integrity, the disclosure presented herein is not limited to such an implementation.

It should also be appreciated that aspects of the subject matter presented herein may be implemented as a computer process, a computer-controlled apparatus, a computing system, or an article of manufacture, such as a computer-readable storage medium. These and various other features will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, tablet computers, electronic book readers, wireless telephone devices, smartphones, e-readers, special-purposed hardware devices, network appliances, or the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 and the following description are intended to provide a brief, general description of a suitable computing environment in which the embodiments described herein may be implemented. In particular, FIG. 1 is a block diagram showing aspects of a trustworthy integrated platform 100 that provides one operating environment for the various embodiments disclosed herein. The environment shown in in FIG. 1 is, however, merely illustrative and the embodiments disclosed herein might be utilized in many other types of environments.

In order to provide the trustworthy indications of software integrity described herein, it is desirable, but not necessary, that a computing device that provides the indications be manufactured and operate within a trustworthy platform stack. For example, it is desirable that the computing device and its constituent hardware, firmware, operating system, and other components are also trustworthy. FIG. 1 provides a simplified description of such a platform stack, the trustworthy integrated platform 100.

As shown in FIG. 1, the platform 100 includes secure processes 102 for the manufacturing of the computing devices described herein. For instance, the processes 102 might include adherence to stringent manufacturing standards, as audited and certified by impartial third parties. The processes 102 are designed to implement safeguards for minimizing the risk of inclusion of compromised components in the computing devices disclosed herein.

The platform 100 also includes processes 104 and procedures for the secure shipping, distribution, and pre-purchase storage of computing devices that provide some or all of the functionality disclosed herein. These processes 104 are designed to minimize the risk of subsequent malicious manipulation of devices between the manufacturer and the recipient or consumer of the computing device.

The platform 100 also specifies the inclusion of hardware 106 designed to provide tamper-resistant storage and execution based upon security-sensitive material (e.g. private keys, signatures, etc.). This hardware 106 allows for strong validation of the trustworthiness of software components executing on the hardware of the device. Additional description regarding several examples of such hardware will be provided below with regard to FIGS. 2 and 3.

In one embodiment, the platform 100 also includes a trusted installer software implementation 108. The trusted installer software implementation 108 is coupled with other components within the platform 100 and allows for software updates, patches, and application installation to be performed without destroying the established chain of trust provided by the other components in the platform 100. The trusted installer software implementation 108 might also be integrated with an application store or other type of application delivery mechanism provided as a part of the platform 100.

As illustrated in FIG. 1, the platform 100 might also include validation routines 110. The implementation of validation routines 100 and corresponding processes by platform/operating system manufacturers enable interaction with a trusted hardware stack to also guarantee the integrity of the operating system executing on the computing devices disclosed herein.

One example of the platform 100 shown in FIG. 1 is a computer manufacturer that manufacturers and ships laptop computers using certified manufacturers and shippers. The laptop computers include functionality for encryption of mass storage devices and secure startup. The laptop computers might also include a TPM for evaluating the integrity of the operating system and application programs that execute on the laptop. In another example, a manufacturer provides smartphones or e-reader devices that are manufactured, delivered, and configured in a similar fashion. Other types of computing devices might also be provided in a similar fashion.

The platform 100 described in FIG. 1 offers useful security guarantees to an end user of a computing device. These guarantees, however, are very abstract in the sense that there is typically no direct indication to the user of these attributes. More specifically, when a user attempts to execute a computer program on a computing device, there is often no way for the user to make a reasonable determination regarding the trustworthiness of the computer program. Even in cases where some attempt is made to assert the safety of an operation or program, these attempts are inevitably rendered on a display screen that is subject to potential subversion by malicious parties. As a result, it is difficult for users to safely trust such assertions. To avoid this, the assertion may be presented by way of a trust indicator that is integrated with or otherwise connected directly to the hardware trust evaluation module.

It should be appreciated that the operating environment shown in FIG. 1 is merely illustrative and that many other types of operating environments might be utilized. In particular, the concepts and technologies disclosed herein for providing a trustworthy indication of software integrity might operate as a part of the platform 100. The components of the platform 100 are not, however, required for every implementation of the various aspects disclosed herein. In this regard the environment shown in FIG. 1 should not be considered as limiting the scope of the inventive concepts disclosed herein in any way.

Figure 2B:
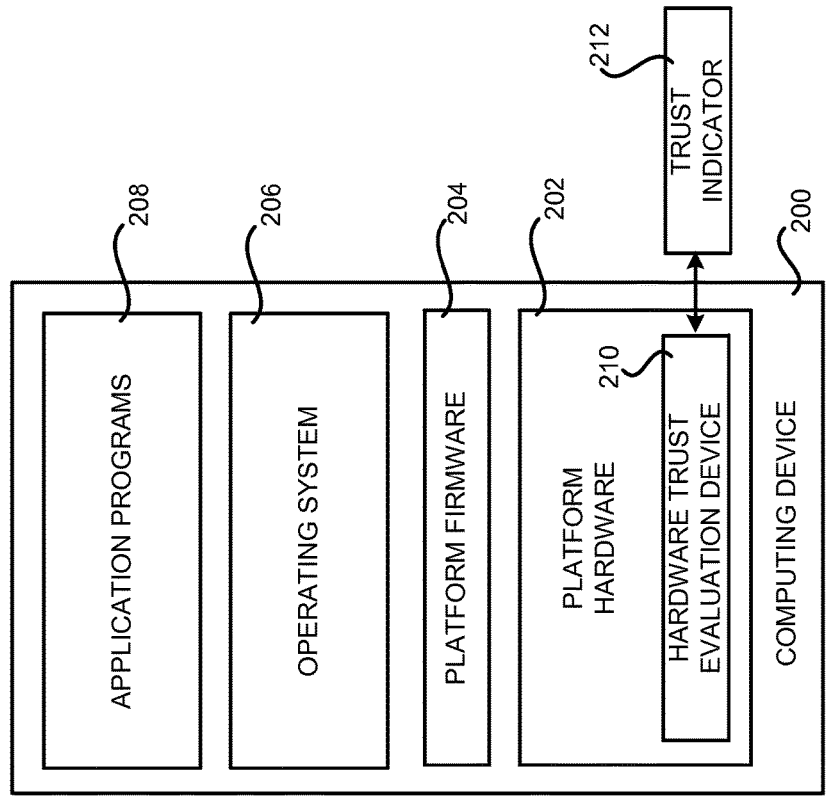
FIGS. 2A-2B are computer architecture diagrams showing several configurations of a computing device that embodies various aspects disclosed herein for providing trustworthy indication of software integrity.
Figure 2A:
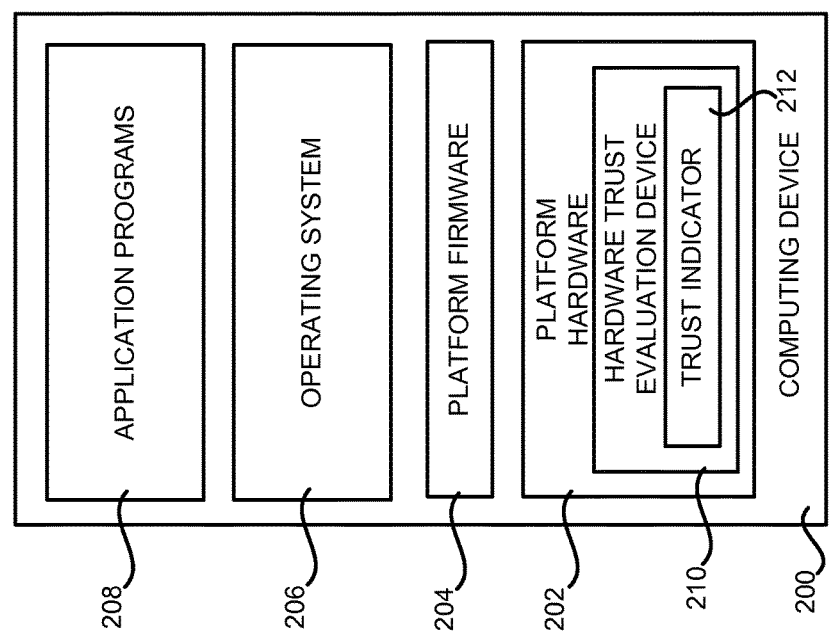

FIGS. 2A-2B are computer architecture diagrams showing several configurations of a computing device 200 that embodies various aspects disclosed herein for providing trustworthy indication of software integrity. The computing device 200 may be a personal computer ("PC"), desktop workstation, laptop computer, tablet computer, notebook computer, personal digital assistant ("PDA"), smartphone, feature phone, electronic-book reader, game console, set-top box, consumer electronics device, server computer, or any other type of computing device.

As shown in FIG. 2A, the computing device 200 includes platform hardware 202. As will be described in greater detail below, the platform hardware 202 may include one or more central processing units ("CPUs"), volatile and non-volatile memory devices, an integrated display screen, hardware input devices, and a touch screen. The platform hardware 202 might also include various other types of devices depending upon the particular configuration. For instance, a smartphone might also include a wireless cellular radio, a global positioning system ("GPS") sensor, a gyroscope, and other types of sensors. A laptop computer might include a physical keyboard, a track pad, network interface devices, and other types of hardware. Other types of computing devices may include other types of platform hardware 202.

A platform firmware 204 executes on the platform hardware 202 in various embodiments disclosed herein. The firmware 204 typically provides functionality for booting the computing device 200. The firmware 204 might also include functionality for providing an interface to the platform hardware 202 to an operation system 206 or application programs 208. The firmware 204 might also provide other types of functionality. Examples of the firmware 204 include, but are not limited to, a PC-compatible basic input/output system ("BIOS") and a firmware compatible with the Unified Extensible Firmware Interface ("UEFI") specification. Other types of firmware 204 might also be utilized.

An operating system 206 executes on top of the firmware 204 that is utilized to control the operation of the computing device 200. According to one embodiment, the operating system comprises the ANDROID operating system from GOOGLE INC. According to another embodiment, the operating system comprises the iOS operating system from APPLE INC. According to further embodiments, the operating system may comprise the LINUX, UNIX, SOLARIS, OS X, or WINDOWS operating systems, from their respective manufacturers. It should be appreciated that another type of operating system 206 might also be utilized.

One or more application programs 208 might also execute on the operating system 206. Applications might execute in the foreground or in the background. An application executing in the foreground typically has its user interface actively presented to a user of the computing device 200. The user interface of an application program 208 executing in the background may not be visible to a user of the computer device 200 or might be inactive.

It should be appreciated that other types of computer programs in addition to the operating system 206 and the application programs 208 might be executed on the computing device 200. For instance, driver programs and other types of low-level software might also be executed on the computing device. In one specific example, a peripheral connected to the computing device 202 might utilize a device driver to support its functionality. Other types of computer programs might also be executed. Additionally, the computing device 200 and the computer programs that execute thereupon might also be designed, manufactured, delivered, and operated utilizing the trustworthy integrated platform 100 described above with regard to FIG. 1.

The computing device 200 might also be equipped with a hardware trust evaluation device 210. The hardware trust evaluation device 210 is a hardware component that is capable of determining the integrity, or trustworthiness, of a computer program executing on the computing device 200. For example, when a user of the computing device 200 requests to launch an application program 208, the operating system 206 might request that the hardware trust evaluation device 210 determine the trustworthiness of the launched application program 208. In response thereto, the hardware trust evaluation device 210 determines the trustworthiness of the application program 208. This determination may be made, at least in part, on material held within a secure location. For example, the hardware trust evaluation device 210 might maintain the public portion of a key associated with a certificate for the signing of application programs. Other mechanisms might also be utilized.

In one implementation the hardware trust evaluation device 210 is a Trusted Platform Module ("TPM") constructed in accordance with the TPM Specification from the Trusted Computing Group. A TPM offers facilities for the secure generation of cryptographic keys, and limitation of their use, in addition to a hardware true random number generator. It also includes capabilities such as remote attestation, binding, and sealed storage. Remote attestation creates a nearly unforgeable hash-key summary of a hardware and software configuration. The program encrypting the data determines the extent of the summary of the software. This allows a third party to verify that the software has not been changed. Binding encrypts data using a TPM endorsement key, a unique RSA key burned into the TPM during its production, or another trusted key descended from it. Sealing encrypts data in similar manner to binding, but in addition specifies a state in which the TPM must be in order for the data to be decrypted (unsealed). The TPM can be used to authenticate hardware devices and to verify the integrity of software. Since each TPM includes a unique and secret RSA key, each TPM is capable of determining the trustworthiness of platform hardware and software executing on the platform. Additional details regarding the structure and operation of a TPM will be provided below with regard to FIG. 3. It should be appreciated that while a TPM is utilized in embodiments as the hardware trust evaluation device 210, other types of hardware devices might also be utilized to evaluate the integrity of a computer program and to present the indicators disclosed herein.

According to embodiments disclosed herein, the hardware trust evaluation device 210 has a trust indicator 212 connected thereto. As mentioned briefly above, the trust indicator 212 is integrated with or connected directly to the hardware trust evaluation device 210. In one embodiment, for instance, the trust indicator 212 is a light, such as an LED, which is soldered directly to the hardware trust evaluation device 210 and visible on an exterior surface of a case of the computing device 200. In other embodiments, the trust indicator 212 is a display, speaker, buzzer, scent generator, or other type of device through which a signal indicating the trustworthiness of a computer program can be provided to a user of the computing device 200. The trust indicator 212 is configured in a manner likely to minimize the possibility that indications provided by the trust indicator 212 can be imitated by malicious program code executing on the computing device 200.

As shown in FIG. 2A, the trust indicator 212 is integrated with the hardware trust evaluation device 210 in one embodiment. For example, the trust indicator 212 might be soldered directly to a circuit board containing the hardware trust evaluation device 210. In another embodiment, shown in FIG. 2B, the trust indicator 212 is connected directly to the hardware trust evaluation device 210, but is not integrated directly with the hardware trust evaluation device 210. For instance, in this embodiment the trust indicator 212 might be connected to the hardware trust evaluation device 210 by one or more wires. Other types of connections might also be made between the hardware trust evaluation device 210 and the trust indicator 212.

As will be described in greater detail below, the computing device 200 is configured in various embodiments to cause the hardware trust evaluation device 210 to evaluate the trustworthiness of a computer program executing on the computing device 200. For example, the hardware trust evaluation device 210 might evaluate the trustworthiness of an application program 208 when the application program is executed in the foreground on the computing device 200. In other embodiments, the hardware trust evaluation device 210 may evaluate the trustworthiness of a device driver program for supporting the operation of a peripheral when the peripheral is connected to the computing device 200. The computing device 200 might also be configured to cause the hardware trust evaluation device 210 to evaluate the trustworthiness of other types of computer programs at other times.

If the hardware trust evaluation device 210 determines that a computer program is trustworthy, the hardware trust evaluation device 210 causes the trust indicator 212 to provide a positive indication of the trustworthiness of the computer program. For example, in an embodiment where the trust indicator 212 is an LED capable of illuminating in multiple colors, the hardware trust evaluation device 210 might cause the LED to illuminate in green to provide a user of the computing device 200 an indication that the computer program is trustworthy. Other types of positive indications of the trustworthiness of a computer program might also be provided.

If the hardware trust evaluation device 210 determines that a computer program is not trustworthy, the hardware trust evaluation device 210 causes the trust indicator 212 to provide a negative indication of the trustworthiness of the computer program. For instance, in an embodiment where the trust indicator 212 is an LED capable of illuminating in multiple colors, the hardware trust evaluation device 210 might cause the LED to illuminate in red to provide a user of the computing device 200 an indication that the computer program is not trustworthy. Other types of negative indications of the trustworthiness of a computer program might also be provided.

According to other embodiments, the computing device 200 is also configured to restrict functionality of a computer program and/or the computing device 200 in response to determining that a computer program on the device is not trustworthy. In this regard, the untrustworthy program may or may not be permitted to continue execution. If the program is permitted to continue execution, however, certain functionality of the program and/or the computing device may be restricted. For example, the computing device 200 might disable or restrict access to hardware components of the computing device 200, restrict access to APIs, remove data from the computing device 200, or entirely disable the computing device 200 in response to determining that a computer program executing on the device is not trustworthy. In other embodiments, the computing device 200 might restrict the dollar amount of transactions that can be performed using the computing device 200 if an untrustworthy program is identified as executing on the device. Other types of functionality might also be restricted in response to identifying a computer program that is not trustworthy.

In other embodiments, the computing device 200 is also configured to enable additional functionality in response to determining that a computer program executing on the device 200 is trustworthy. For example, the computing device 200 might take certain actions, such as providing a password or other type of credentials on behalf of a user, if an application program is deemed to be trustworthy. Other types of actions might also be performed in response to determining that a computer program executing on the computing device 200 is trustworthy. Additional details regarding these and other aspects of the computing device 200 disclosed herein will be provided below with regard to FIGS. 3-8.

Figure 3:
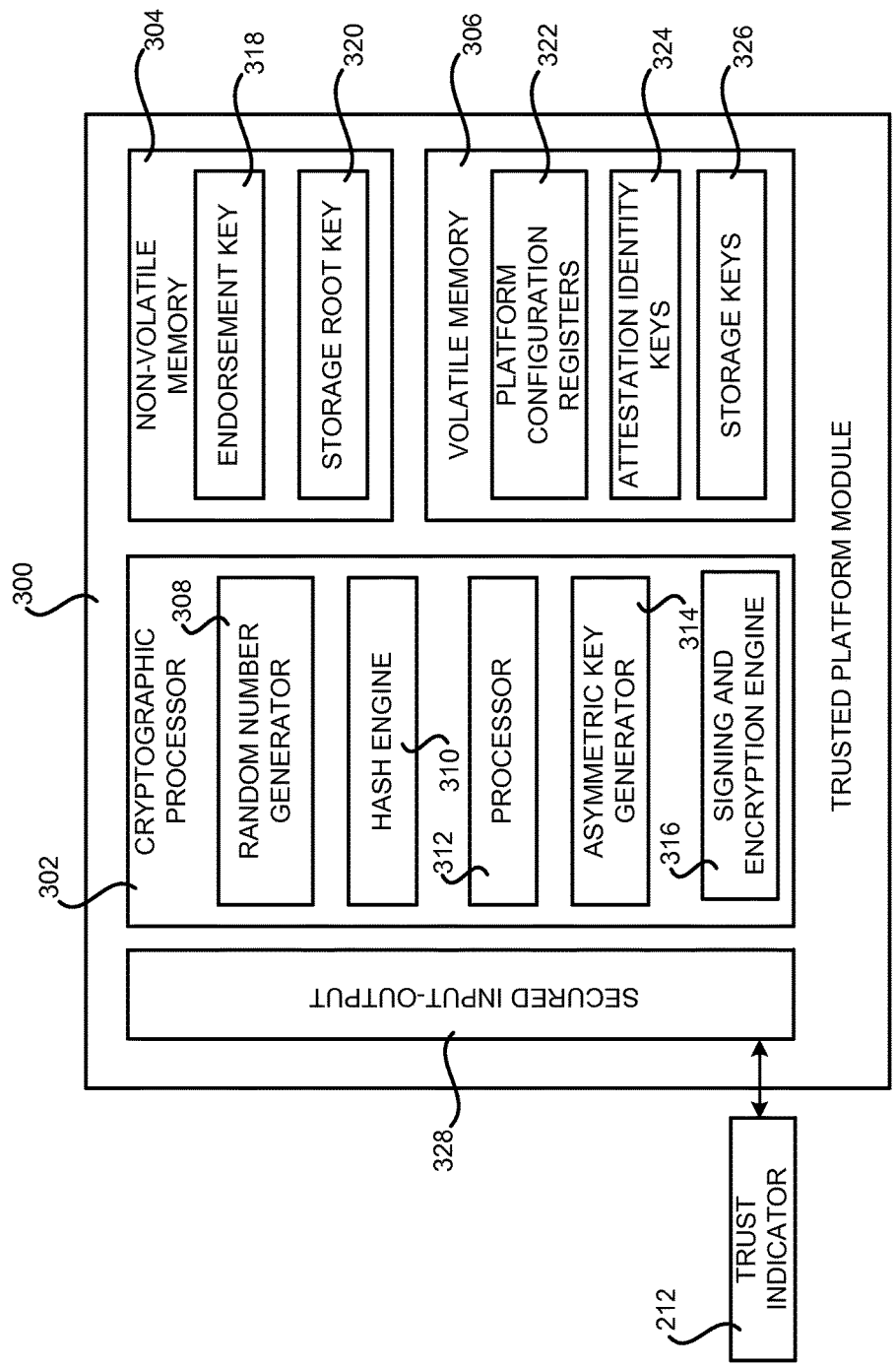
FIG. 3 is a computer architecture diagram showing the configuration of a Trusted Platform Module that may be utilized to implement various aspects disclosed herein for providing trustworthy indication of software integrity.
Figure 4:
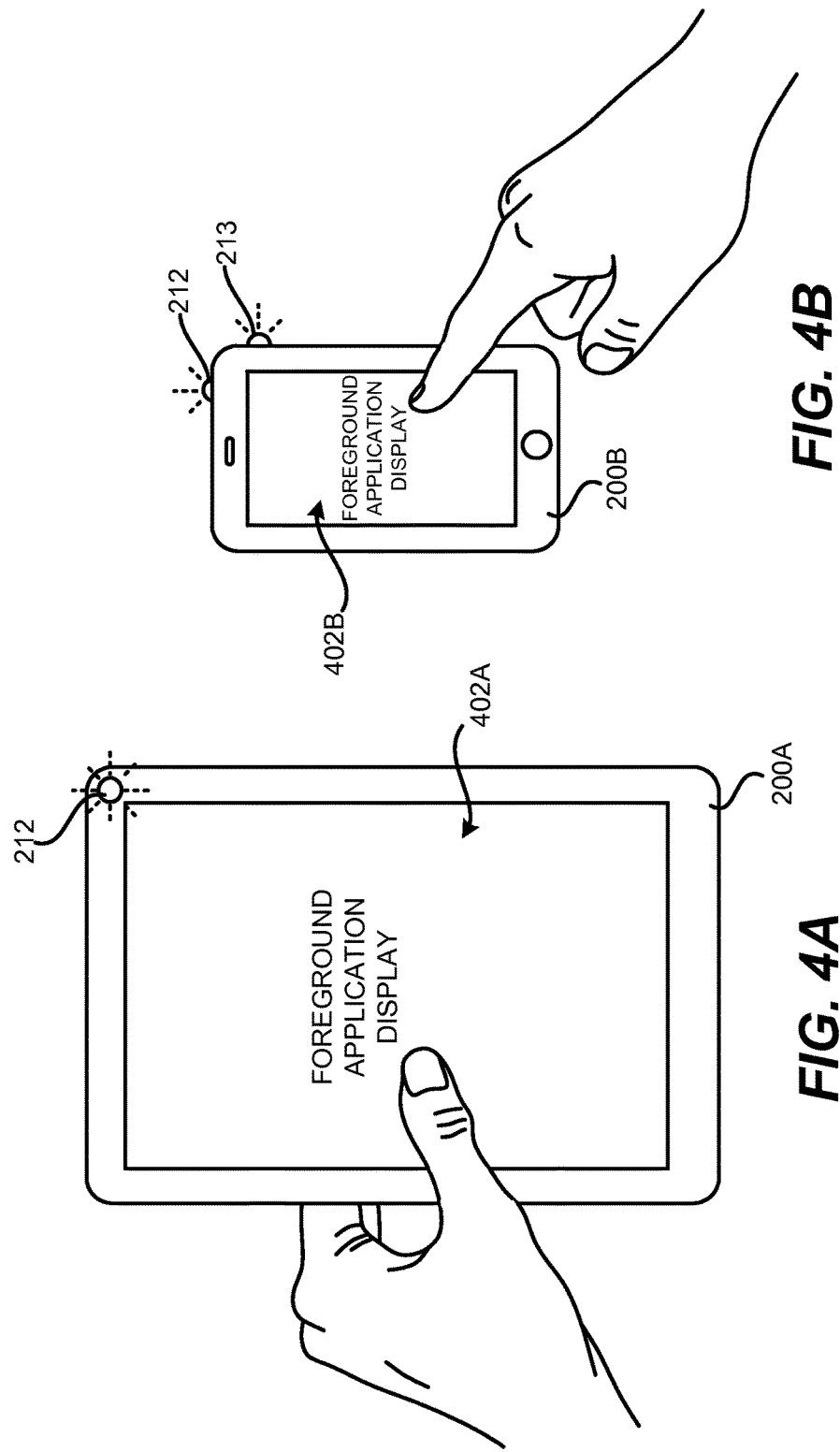
FIGS. 4A-4B are device diagrams showing aspects of the utilization of a tablet device and a smartphone device, respectively, that implement at least some of the functionality disclosed herein for providing trustworthy indication of software integrity.

As mentioned above with regard to FIGS. 2A-2B, the hardware trust evaluation device 210 is a TPM in one implementation. FIG. 3 is a computer architecture diagram showing the configuration of a TPM 300 that may be utilized to implement various aspects disclosed herein for providing trustworthy indication of software integrity. As shown in FIG. 3, the TPM 300 includes a cryptographic processor 302, a non-volatile memory 304, and a volatile memory 306. The cryptographic processor 302 includes a random number generator 308, a hash engine 310, a processor 312, an asymmetric key generator 314, and a signing and encryption engine 316. The non-volatile memory 304 stores an endorsement key 318 and a storage root key 320. The volatile memory 306 stores platform configuration registers 322, attestation identity keys 324, and storage keys 326. In this regard, it should be appreciated that the TPM 300 may be configured to perform many more functions than those described herein for providing a trustworthy indication of software integrity.

In one implementation, the TPM 300 also includes a secured input-output module 328. The secured input-output module 328 might include appropriate circuitry for driving the trust indicator 212. For instance, the secured input-output module 328 might include appropriate circuitry for driving one or more single or multi-colored LEDs or other type of lights. Other types of circuitry might also be provided for driving other types of trust indicators 212, such as displays, buzzers, speakers, and others.

As also mentioned briefly above, the trust indicator 212 might be integrated directly into the TPM 300. For instance, the trust indicator 212 might be soldered directly to the TPM. In this embodiment, the TPM 300 might be installed in a case of a computing device 200 such that the trust indicator 212 can protrude through the case and be visible to a user of the device from the outside of the case. In other embodiments, a wire might be utilized to connect the trust indicator 212 to the TPM 300. In this embodiment, the trust indicator 212 might also be mounted in the case of the computing device 200 such that it protrudes through the case and is visible from the exterior of the computing device. Using a wire to connect the trust indicator 212 to the TPM 300 might provide flexibility in locating the TPM 300 within the case of the computing device 200. Other implementations might also be utilized. Regardless of the implementation utilized, no components in a computing device 200 other than the TPM 300 should have access to or be able to activate the trust indicator 212.

According to various embodiments, the cryptographic processor 302 is configured to determine the trustworthiness of computer programs executing on the computing device 200. This functionality might be performed in response to a request from the operating system 206, for instance, or in response to a request from another component. If the cryptographic processor 302 determines that a computer program is trustworthy, the cryptographic processor 302 causes the secured input-output module 328 to provide a positive indication of the trustworthiness of the computer program by way of the trust indicator 212. If the cryptographic processor 302 determines that a computer program is not trustworthy, the cryptographic processor 302 causes the secured input-output module 328 to provide a negative indication of the trustworthiness of the computer program by way of the trust indicator 212. Additional details regarding these processes will be provided below with regard to FIGS. 4A-8.

FIGS. 4A-4B are device diagrams showing aspects of the utilization of several computing devices 200 that implement at least some of the functionality disclosed herein for providing trustworthy indication of software integrity. In particular, FIG. 4A shows a tablet computing device 200A that includes the functionality disclosed herein. As illustrated in FIG. 4A, the tablet computing device 200A includes a trust indicator 212 that is exposed on the user-facing surface of the tablet computing device 200A. Internally, the trust indicator 212 is connected to a hardware trust evaluation device 210 in the manner described above.

A user of the tablet computing device 200A may utilize various mechanisms to begin the execution of an application program on the tablet computing device 200A. When the application is started, it may be executed in the foreground and present a foreground application display 402A on a display screen of the table computing device 200A. Additionally, when the application program is executed and comes to the foreground, an operating system 206 executing on the tablet computing device 200A may request that the hardware trust evaluation device 210 evaluate the trustworthiness of the foreground application program. If the application program is found to be trustworthy, the hardware trust evaluation device 210 will provide a positive indication of the trustworthiness of the application program by way of the trust indicator 212. For instance, the hardware trust evaluation device 210 might cause the trust indicator 212 to be illuminated in the color green.

If the application program is found to not be trustworthy, the hardware trust evaluation device 210 will provide a negative indication of the trustworthiness of the application program by way of the trust indicator 212. For instance, the hardware trust evaluation device 210 might cause the trust indicator 212 to be illuminated in the color red. In this way, a user of the tablet computing device 200A can be provided an indication of the trustworthiness of the application program in a manner that is not likely to be spoofed by malicious code executing on the tablet computing device 200A. If a negative indication of trustworthiness is provided, the user of the device 200A would understand not to enter credit card information, password information, other private or sensitive information, or to take any other actions that might be utilized by a malicious computer program.

The various concepts and technologies disclosed herein might also be utilized with a smartphone computing device 200B, such as that shown in FIG. 4B. In the example shown in FIG. 4B, a trust indicator 212 has been located on a top surface of the smartphone computing device 200B. When an application is executed in the foreground on the smartphone computing device 200B, the application may present a foreground application display 402B. Additionally, the trustworthiness of the application may be determined in the manner described above. A positive or negative indication of the trustworthiness of the application may then be provided to a user of the smartphone computing device 200B by way of the trust indicator 212.

It should be appreciated that the trust indicator 212 might also be utilized to provide indications of the trustworthiness of other types of program code executing on a computing device 200. For instance, the trust indicator 212 might be utilized to indicate the integrity of the operating system 206 at a boot time of a computing device 200. The trust indicator 212 might also be utilized to indicate the integrity of device drivers for a peripheral device at the time the peripheral is connected to the computing device 200. The trust indicator 212 might also be utilized to provide an indication that the integrity of a program cannot be measured. For instance, the trust indicator 212 may be illuminated in yellow or flashed in a certain pattern if the trustworthiness of an application cannot be measured for some reason.

According to other embodiments, multiple trust indicators 212 might be utilized. For example, two or more indicators 202 might be utilized to present varying degrees of trust for a computer program. Additionally, the indications provided by the trust indicators 212 might be configured for use by persons with disabilities. For example, the trust indicators 212 might be configured to present indicators that can be easily distinguished by persons with color blindness. In a similar fashion, sounds, haptic feedback, or olfactory signals might be provided for people that are partially or completely blind. Other types of audible, visual, tactile, haptic, and olfactory feedback might be utilized for persons with other types of disabilities. In this regard, it should be appreciated that the indications might be conveyed by way of any of the human senses.

The trust indicator 212 might also be configured to provide other types of indications in other embodiments. For instance, the trust indicator 212 might be configured to protrude, vibrate, become warm to the touch, or provide another type of feedback when a program is determined to be trustworthy or untrustworthy. Unique vibration patterns or patterns of flashing lights may be employed to indicate trust or distrust of a computer program. Additionally, non-activity might be utilized to indicate trust or distrust. For instance, if a program is determined to be trustworthy, the trust indicator 212 might do nothing. If, however, a program is determined to not be trustworthy, the trust indicator 212 may be activated. Other implementations might also be utilized.

In the example shown in FIG. 4B, the smartphone computing device 200B is also configured with a secondary trust indicator 213. The secondary trust indicator 213 might be connected to the hardware trust evaluation device 210 and configured in a manner similar to the trust indicator 212 described above. The secondary trust indicator 213 might, however, be utilized to provide other types of indications of trustworthiness in addition to those provided by the trust indicator 212. For instance, where the trustworthiness of an executing application has been verified, the secondary trust indicator 213 might be utilized to provide an indication of the trust-worthiness of elements, activities, data, etc. occurring within the trusted application.

As one example, a trusted Web browser application executing on the device 200B might turn the secondary trust indicator 213 red if it suspects the current Web site to be malicious in some way. An e-mail client executing on the device 200B might similarly turn the secondary trust indicator 213 red, or show something else on a mini-display, etc., if an e-mail message is suspected to have malicious content or unsolicited bulk e-mail ("UBE" or "spam"). In another example, an e-mail client executing on the device 200B might turn the secondary trust indicator 213 orange if it receives a non-spam e-mail from a person not identified in a user's address book. In another example, a word processing program executing on the device 200B might turn the secondary trust indicator 213 green if a document being edited is from a "trusted sender." A trusted sender might be identified based upon a signature or other cryptographic/identity construct. It should be utilized that an application executing on the device 200B might utilize a secondary trust indicator 213 in ways other than those described above.

In some embodiments, the measurement of the integrity of a computer program occurs without user input. In other implementations, however, a user might request that the trustworthiness of an application be evaluated. For example, the trust indicator 212 might include a light and a switch. In this example, a user of a computing device 200 might press down on the trust indicator 212 to activate the switch and request that the hardware trust evaluation device 210 evaluate the trustworthiness of the program executing in the foreground. Other types of mechanisms might also be utilized to request the evaluation of the integrity of programs executing in the background or programs that do not render any type of user interface.

It should be appreciated that while FIGS. 4A and 4B illustrate a tablet computing device 200A and a smartphone computing device 200B, respectively, the embodiments disclosed herein might be utilized with other types of computing devices. For instance, the embodiments disclosed herein might be utilized with PCs, desktop workstations, laptop computers, notebook computers, PDAs, feature phones, electronic-book ("e-book") readers, game consoles, set-top boxes, consumer electronics devices, server computers, and other types of computing devices. In implementations where a computing device utilizes an external display, it may be necessary to implement a protocol for trusted interaction between the measuring device and the display device upon which the trust indicator 212 is located.

Figure 5:
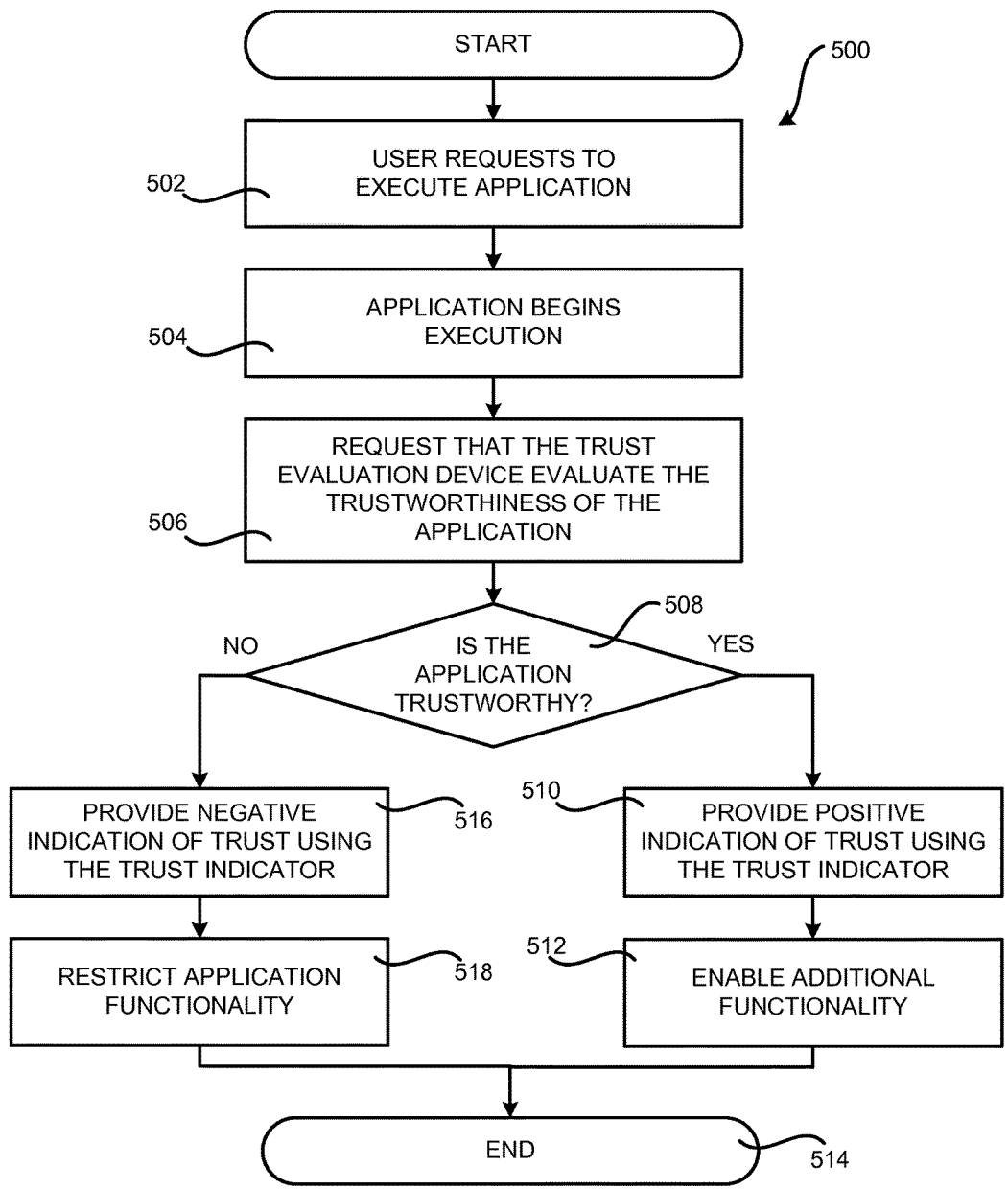
FIG. 5 is a flow diagram showing aspects of one illustrative routine for providing a trustworthy indication of the integrity of an application program, according to one embodiment disclosed herein.

Turning now to FIG. 5, additional details will be provided regarding the embodiments described herein for providing a trustworthy indication of software integrity. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein with reference to the various FIGURES are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 5 is a flow diagram showing aspects of one illustrative routine 500 for providing a trustworthy indication of the integrity of an application program 208, according to one embodiment disclosed herein. The routine 500 begins at operation 502, where a user requests to execute an application program 208 on a computing device 200. In response to receiving such a request, the routine 500 proceeds to operation 504, where the selected application program 208 begins executing in the foreground.

From operation 504, the routine 500 proceeds to operation 506, where the operating system 206 requests that the hardware trust evaluation device 210 evaluates the trustworthiness of the application program 208 executing in the foreground. In response thereto, the hardware trust evaluation device 210 evaluates the trustworthiness of the application program 208 in the manner described above.

If, at operation 508, the hardware trust evaluation device 210 determines that the application program 208 executing in the foreground is trustworthy, the routine 500 proceeds from operation 508 to operation 510. At operation 510, the hardware trust evaluation device 210 provides a positive indication of the trustworthiness of the application program 208 using the trust indicator 212. For example, the hardware trust evaluation device 210 might cause an LED trust indicator 212 to illuminate in the color green.

From operation 510, the routine 500 proceeds to operation 512, where additional functionality might be enabled in response to determining that the application program 208 executing in the foreground is trustworthy. For example, the computing device 200 might take certain actions on behalf of a user of the computing device 200, such as providing a password or other type of credentials without requiring user input, if an application program 200 is deemed to be trustworthy. Other types of actions might also be performed in response to determining that a computer program executing on the computing device 200 is trustworthy.

If, at operation 508, the hardware trust evaluation device 210 determines that the application program 208 executing in the foreground is not trustworthy, the routine 500 proceeds from operation 508 to operation 516. At operation 516, the hardware trust evaluation device 210 provides a negative indication of the trustworthiness of the application program 208 using the trust indicator 212. For example, the hardware trust evaluation device 210 might cause an LED trust indicator 212 to illuminate in the color green.

From operation 516, the routine 500 proceeds to operation 518, where the computing device 200 might also restrict functionality of the application program 208 and/or the computing device 200 in response to determining that the application program 208 is not trustworthy. For example, the computing device 200 might disable or restrict access to hardware components of the computing device 200, restrict access to APIs on the computing device 200, remove data from the computing device 200, terminate the execution of the application program 208, or entirely disable the computing device 200 in response to determining that the application program 208 is not trustworthy. Other types of functionality might also be restricted in response to identifying an application program 208 that is not trustworthy. From operations 512 and 518, the routine 500 proceeds to operation 514, where it ends.

It should be appreciated that, in various embodiments, one or more of operations 510, 512, 516, and 518 might be omitted. For instance, a negative indication of trust might be provided at operation 516, but operation 518 might be omitted. In a similar fashion, functionality might be restricted at operation 518 without providing a negative indication of trust at operation 516. As another example, a positive indication of trust might be provided at operation 510, but operation 512 might be omitted. Similarly, additional functionality might be provided at operation 512 without providing a positive indication of trust at operation 510.

Figure 6:
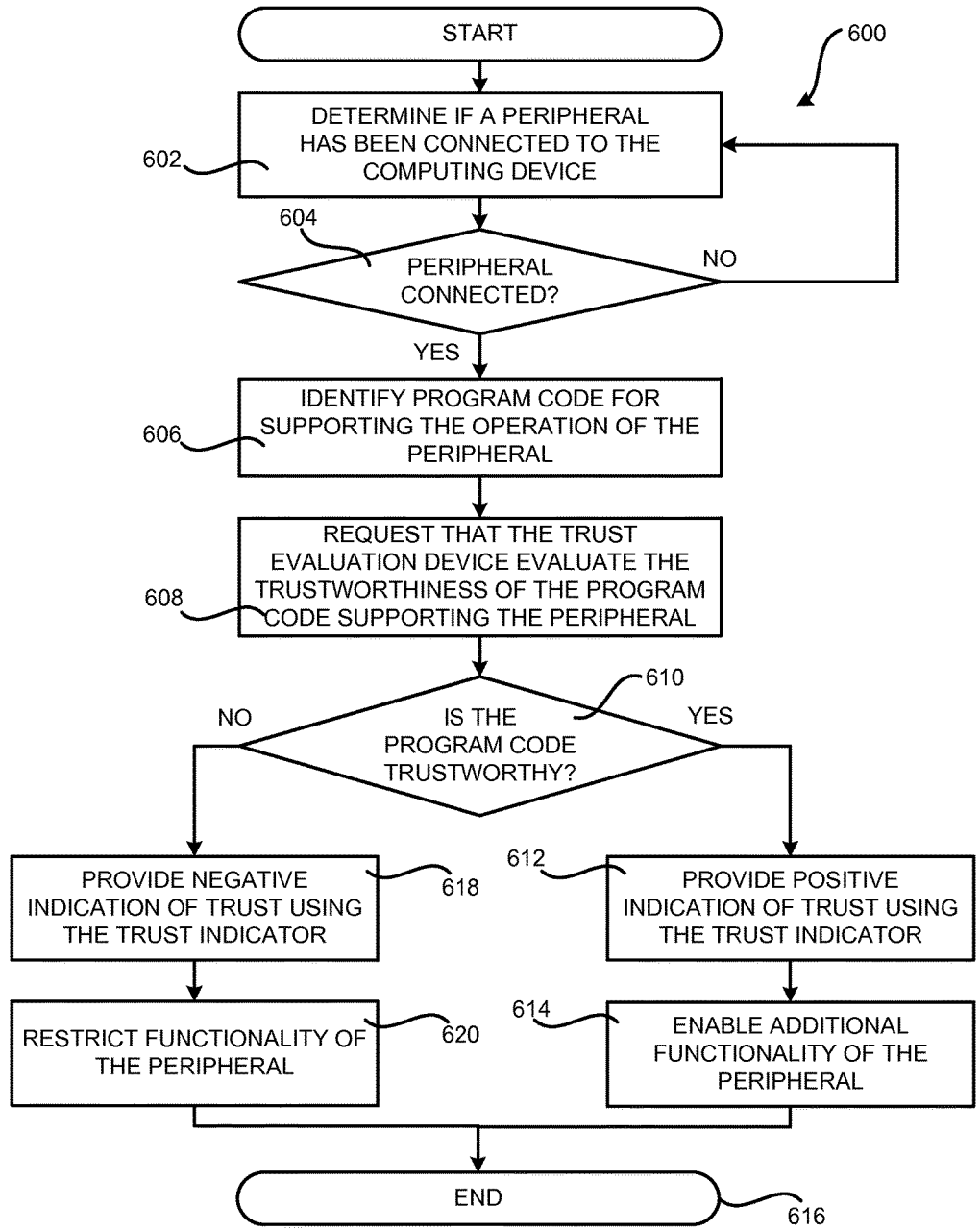
FIG. 6 is a flow diagram showing aspects of one illustrative routine for providing a trustworthy indication of the integrity of program code for supporting the operation of a peripheral device, such as a device driver, according to one embodiment disclosed herein.

As mentioned briefly above, the embodiments disclosed herein might also be utilized to provide a secure indication of the trustworthiness of computer programs other than application programs. For instance, the embodiments disclosed herein might provide an indication of the trustworthiness of driver programs and other low level software, such as a device driver for a peripheral device executing on the computing device 200. FIG. 6 is a flow diagram showing aspects of one illustrative routine 600 for providing a trustworthy indication of the integrity of a device driver for supporting the operation of a peripheral device according to one embodiment disclosed herein.

The routine 600 begins at operation 602, where the operating system 206 determines whether a peripheral has been connected to the computing device 200. If a peripheral has not been connected, the routine 600 proceeds from operation 604 back to operation 602, where another such determination is made. If, however, a peripheral has been connected to the computing device 200, the routine 600 proceeds from operation 604 to operation 606.

At operation 606, the operating system 206 identifies one or more device drivers for supporting the operation of the connected peripheral. The routine 600 then proceeds to operation 608, where the operating system 206 requests that the hardware trust evaluation device 210 evaluate the integrity of the identified device driver, or drivers. In response thereto, the hardware trust evaluation device 210 evaluates the trustworthiness of the device driver, or drivers, for supporting the operation of the peripheral in the manner described above.

If, at operation 610, the hardware trust evaluation device 210 determines that a device driver is trustworthy, the routine 600 proceeds from operation 610 to operation 612. At operation 612, the hardware trust evaluation device 210 provides a positive indication of the trustworthiness of the device driver using the trust indicator 212. For example, the hardware trust evaluation device 210 might cause an LED trust indicator 212 to blink in the color green for a preset period of time (e.g. 5 seconds). Other types of positive indications of trust might also be provided.

From operation 612, the routine 600 proceeds to operation 612, where additional functionality of the peripheral might be enabled in response to determining that the device driver is trustworthy. Other types of actions might also be performed in response to determining that the device driver for the peripheral is trustworthy.

If, at operation 610, the hardware trust evaluation device 210 determines that the device driver is not trustworthy, the routine 600 proceeds from operation 610 to operation 618. At operation 618, the hardware trust evaluation device 210 provides a negative indication of the trustworthiness of the device driver using the trust indicator 212. For example, the hardware trust evaluation device 210 might cause an LED trust indicator 212 to blink in the color red for a certain period of time. When a device driver is determined to be trustworthy or untrustworthy, a different type of indication may be provided than when an application program is deemed to be trustworthy or untrustworthy. In this manner, a user of the computing device 200 can discern the type of program that has been evaluated for trustworthiness.

From operation 618, the routine 600 proceeds to operation 620, where the computing device 200 might also restrict functionality of the peripheral and/or the computing device 200 in response to determining that the device driver is not trustworthy. For example, the computing device 200 might disable or restrict access to hardware components of the computing device 200, restrict access to APIs on the computing device 200, remove data from the computing device 200, terminate the execution of the device driver to disable operation of the peripheral, or entirely disable the computing device 200 in response to determining that the device driver is not trustworthy. Other types of functionality might also be restricted in response to identifying a device driver that is not trustworthy. From operations 614 and 620, the routine 600 proceeds to operation 616, where it ends.

It should be appreciated that, in various embodiments, one or more of operations 612, 614, 618, and 620 might be omitted. For instance, a negative indication of trust might be provided at operation 618, but operation 620 might be omitted. In a similar fashion, functionality might be restricted at operation 620 without providing a negative indication of trust at operation 618. As another example, a positive indication of trust might be provided at operation 612, but operation 614 might be omitted. Similarly, additional functionality might be provided at operation 614 without providing a positive indication of trust at operation 612.

In some other embodiments, a user or administrator of the computing device 200 might be permitted to define the manner in which the integrity of computer programs is evaluated and the manner in which the results of the evaluations are communicated to the user. For example, a user or administrator might define a policy such that the trust indicator 212 might provide a positive indication of trust if an application program does not call certain APIs even if the program is unsigned. If the program does call certain security sensitive APIs, then the trust indicator 212 may provide a negative indication of trust if the program is unsigned. In this way, programs that perform certain low-level operations that are not deemed to be security risks may be permitted to execute even though their trustworthiness cannot be readily ascertained. In other embodiments, a policy may be defined that requires the trust indicator 212 to provide a negative indication of trust if an application uses certain sensitive APIs, even if the application is deemed trustworthy.

According to other implementations, a user interface might be provided on the computing device 200 through which a user can select a program installed on the device and request that the trustworthiness of the selected program be evaluated. The results of the evaluation may be presented by way of the trust indicator 212 in the manner described above. In this way, the trustworthiness of programs can be evaluated in response to user input and at a time other than the run time of the programs.

Figure 7:
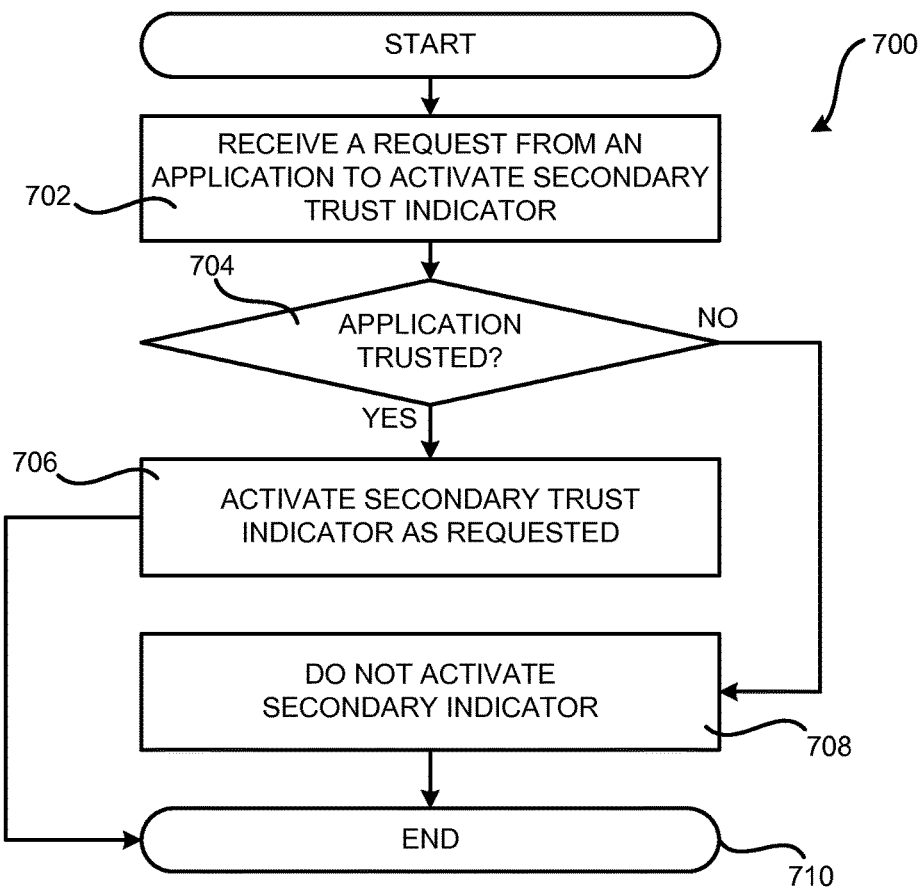
FIG. 7 is a flow diagram showing aspects of one illustrative routine for activating a secondary trust indicator, according to one embodiment disclosed herein.

FIG. 7 is a flow diagram showing aspects of one illustrative routine 700 for activating a secondary trust indicator 213, according to one embodiment disclosed herein. As discussed above with regard to FIG. 4B, a device 200 might be equipped with a secondary trust indicator 213 in some implementations. In these implementations, an application 208, operating system 206, or other type of program might be permitted to activate and/or otherwise utilize the secondary trust indicator 213 if the application 208, operating system 206, or other type of program has been deemed to be trustworthy. FIG. 7 shows one illustrative routine 700 for activating a secondary trust indicator 213 in this manner.

The routine 700 begins at operation 702, where the hardware trust evaluation device 210 receives a request from an application 208, operating system 206, or other type of program to activate a secondary trust indicator 213. In response to receiving such a request, the routine 700 proceeds to operation 704, where the hardware trust evaluation device 210 determines whether the program making the request has been previously verified as trustworthy.

If the program requesting to utilize the secondary trust indicator 213 has not been previously verified as trustworthy, the routine 700 proceeds from operation 704 to operation 708 where the request to utilize the secondary trust indicator 213 is denied. In an alternate embodiment, a determination of the trustworthiness of the program might be performed in the manner described above. If the program is deemed to be trustworthy, the program will be permitted to utilize the secondary trust indicator 213. If the program is not deemed to be trustworthy, the request will be denied at operation 708.

If, at operation 704, the hardware trust evaluation device 210 determines that the program requesting access to the secondary trust indicator 213 has been determined to be trustworthy, the routine 700 proceeds from operation 704 to operation 706. At operation 706, the hardware trust evaluation device 210 activates the secondary trust indicator 213 in the manner requested by the program. For instance, and as described above, the secondary trust indicator 213 might be activated in order to provide an indication of the trustworthiness of elements, activities, and/or data within or under the control of the trusted program making the request to utilize the secondary trust indicator 213. From operations 706 and 708, the routine 700 proceeds to operation 710, where it ends.

Figure 8:
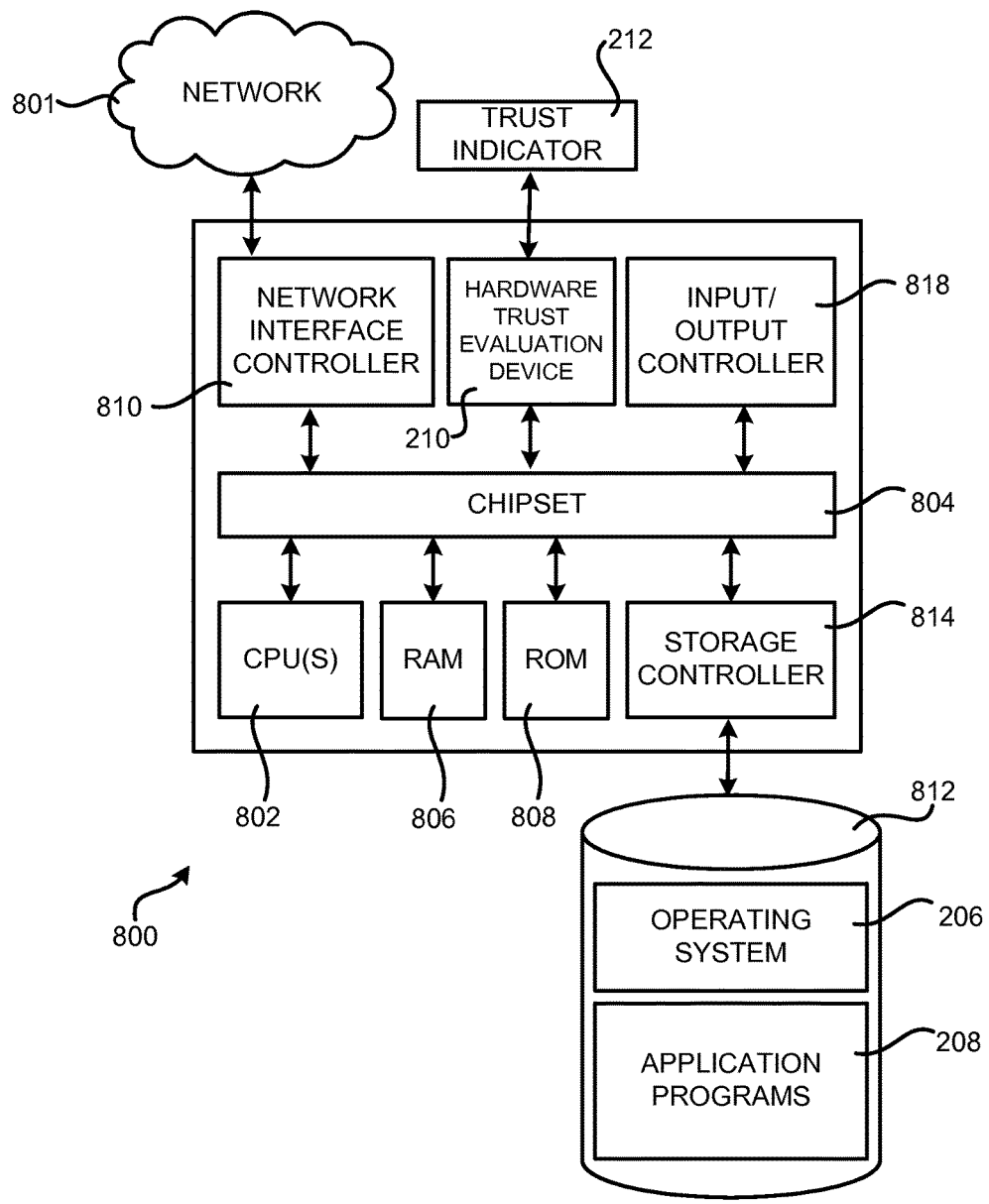
FIG. 8 is a computer architecture diagram showing one illustrative computer hardware architecture for use in computing devices configured to implement at least some of the concepts and technologies disclosed herein in one embodiment.

FIG. 8 shows an example computer architecture for a computing device 800 capable of providing the functionality disclosed herein for trustworthy indication of software integrity. The computer architecture shown in FIG. 8 may be utilized to implement the various computing devices described above, such as a server computer, workstation, desktop computer, laptop, smartphone, personal digital assistant, e-book reader, digital wireless phone, tablet computer, network appliance, set-top box, or other computing device. The computer architecture shown in FIG. 8 might be utilized to implement other types of computing devices. Other types of architectures might also be utilized.

The computing device 800 includes a baseboard, or "motherboard," which is a printed circuit board to which a multitude of components or devices may be connected by way of a system bus or other electrical communication paths. In one illustrative embodiment, one or more central processing units ("CPUs") 802 operate in conjunction with a chipset 804. The CPUs 802 are standard programmable processors that perform arithmetic and logical operations necessary for the operation of the computer 800.

The CPUs 802 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 804 provides an interface between the CPUs 802 and the remainder of the components and devices on the baseboard. The chipset 804 may provide an interface to a random access memory ("RAM") 806, used as the main memory in the computer 800. The chipset 804 may further provide an interface to a computer-readable storage medium such as a read-only memory ("ROM") 808 or non-volatile RAM ("NVRAM") for storing basic routines that that help to startup the computing device 800 and to transfer information between the various components and devices. The ROM 808 or NVRAM may also store other software components necessary for the operation of the computing device 800 in accordance with the embodiments described herein.

According to various embodiments, the computing device 800 may operate in a networked environment using logical connections to remote computing devices and computer systems through a network, such as a local-area network ("LAN"), a wide-area network ("WAN"), the Internet, or any other networking topology known in the art that connects the computing device 800 to remote computers. The chipset 804 includes functionality for providing network connectivity through a network interface controller ("NIC") 810, such as a gigabit Ethernet adapter.

For example, the NIC 810 may be capable of connecting the computing device 800 to other computing devices over a network 801, such as the Internet. It should be appreciated that multiple NICs 810 may be present in the computing device 800, connecting the computing device 800 to other types of networks and remote computer systems.

The computing device 800 may be connected to a mass storage device 812 that provides non-volatile storage for the computer. The mass storage device 812 may store system programs, application programs, other program modules, and data, which have been described in greater detail herein. The mass storage device 812 may be connected to the computing device 800 through a storage controller 814 connected to the chipset 804. The mass storage device 812 may consist of one or more physical storage units. The storage controller 814 may interface with the physical storage units through a serial attached SCSI ("SAS") interface, a serial advanced technology attachment ("SATA") interface, a FIBRE CHANNEL ("FC") interface, or other standard interface for physically connecting and transferring data between computers and physical storage devices.

The computing device 800 may store data on the mass storage device 812 by transforming the physical state of the physical storage units to reflect the information being stored. The specific transformation of physical state may depend on various factors in different implementations. Examples of such factors may include, but are not limited to, the technology used to implement the physical storage units, whether the mass storage device 812 is characterized as primary or secondary storage, or the like.

For example, the computing device 800 may store information to the mass storage device 812 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may further read information from the mass storage device 812 by detecting the physical states or characteristics of one or more particular locations within the physical storage units.

In addition to the mass storage device 812 described above, the computing device 800 might have access to other computer-readable media to store and retrieve information, such as program modules, data structures, or other data. It should be appreciated by those skilled in the art that computer-readable media can be any available media that may be accessed by the computing device 800, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information. Computer-readable storage media does not include transitory signals.

The mass storage device 812 may store an operating system 206 utilized to control the operation of the computing device 800. According to one embodiment, the operating system comprises the ANDROID operating system. According to another embodiment, the operating system comprises the iOS operating system from APPLE INC. According to further embodiments, the operating system may comprise the LINUX, UNIX, SOLARIS, or WINDOWS operating systems, from their respective manufacturers. It should be appreciated that other operating systems may also be utilized. The mass storage device 812 may store other system or application programs and data utilized by the computing device 800.

In one embodiment, the mass storage device 812 or other computer-readable storage media may be encoded with computer-executable instructions that, when loaded into the computing device 800, transform the computing device from a general-purpose computing system into a special-purpose computer capable of implementing the embodiments described herein. These computer-executable instructions transform the computing device 800 by specifying how the CPUs 802 transition between states, as described above. According to one embodiment, the computing device 800 has access to computer-readable storage media storing computer-executable instructions that, when executed by the computer, perform the various routines and operations described herein.

The computing device 800 may also include an input/output controller 818 for receiving and processing input from a number of input devices, such as a keyboard, a mouse, a touchpad, a touch screen, an electronic stylus, or other type of input device. Similarly, the input/output controller 818 may provide output to a display device, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As illustrated in FIG. 8, the computing device 800 might also be equipped with a hardware trust evaluation device 210. As also shown in FIG. 8 and described above, a trust indicator 212 may also be connected to or integrated with the hardware trust evaluation device 210. Through the use of these devices, the computing device 800 can provide a trustworthy indication of software integrity in the manner described above.

Based on the foregoing, it should be appreciated that technologies for providing a trustworthy indication of software integrity have been presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A computer-implemented method for providing a trustworthy indication of the integrity of a computer program, the computer-implemented method comprising executing instructions in a computing device to perform the operations of:
   in response to receiving a request to execute the computer program, causing a hardware trust evaluation device located inside the computing device to determine trustworthiness of the computer program;
   in response to the hardware trust evaluation device determining that the computer program is trustworthy, causing a trust indicator that is integrated into a circuit board containing the trust evaluation device and is visible on an external surface of the computing device to provide a positive indication of the trustworthiness of the computer program, the trust indicator comprising one or more lights;
   in response to the hardware trust evaluation device determining that the computer program is not trustworthy, causing the trust indicator to provide a negative indication of the trustworthiness of the computer program and restricting functionality provided by the computer program;
   receiving a selection from a list of computer programs currently executing; and
   in response to receiving the selection, providing an indication of trustworthiness of the selected computer program by way of the trust indicator.

2. The computer-implemented method of claim 1, wherein the trust indicator is configured to minimize a possibility that indications provided by the trust indicator can be imitated by malicious program code executing on the computing device.

3. The computer-implemented method of claim 1, wherein the computing device further comprises a secondary trust indicator that includes at least one of a light, a display, a speaker, a buzzer or a scent generator.

4. The computer-implemented method of claim 1, wherein restricting functionality provided by the computer program comprises restricting access of the computer program to one or more hardware components of the computing device.

5. The computer-implemented method of claim 1, further comprising performing functionality on behalf of a user in response to the hardware trust evaluation device determining that the computer program is trustworthy.

6. The computer-implemented method of claim 1, wherein restricting functionality provided by the computer program comprises restricting access of the computer program to one or more application programming interfaces provided by the computing device.

7. The computer-implemented method of claim 1, wherein the computer program comprises an application program.

8. The computer-implemented method of claim 1, wherein the computer program comprises a device driver for a peripheral connected to the computing device.

9. A non-transitory computer-readable storage medium having computer-executable instructions stored thereupon which, when executed by a computing device having a hardware trust evaluation device integrated therein and a trust indicator connected directly to the hardware trust evaluation device, cause the computing device to:
   determine, by way of the hardware trust evaluation device, that a computer program executing on the computing device is trustworthy based on a definition of trustworthiness provided by a user of the computing device, wherein the definition specifies a policy for the trust indicator to provide a positive indication of trust and a negative indication of trust; and
   in response to the hardware trust evaluation device determining that the computer program is trustworthy, provide a positive indication of the trustworthiness of the computer program by way of the trust indicator, wherein the trust indicator comprises a display that is connected directly to the trust evaluation device and is visible on an external surface of the computing device.

10. The computer-readable storage medium of claim 9, having further computer-executable instructions stored thereupon which, when executed by the computing device, cause the computing device to provide a negative indication of the trustworthiness of the computer program by way of the trust indicator in response to determining that the computer program is not trustworthy.

11. The computer-readable storage medium of claim 9, having further computer-executable instructions stored thereupon which, when executed by the computing device, cause the computing device to restrict functionality provided by the computer program in response to the hardware trust evaluation device determining that the computer program is not trustworthy.

12. The computer-readable storage medium of claim 9, wherein the hardware trust evaluation device comprises a Trusted Platform Module (TPM).

13. The computer-readable storage medium of claim 9, wherein the trust indicator comprises one or more lights that are visible on an external surface of the computing device.

14. The computer-readable storage medium of claim 11, wherein restricting the functionality provided by the computer program comprises removing data from the computing device.

15. The computer-readable storage medium of claim 11, wherein restricting the functionality provided by the computer program comprises terminating execution of the computer program.

16. The computer-readable storage medium of claim 11, wherein restricting the functionality provided by the computer program comprises preventing access to one or more hardware components of the computing device.

17. The computer-readable storage medium of claim 9, wherein the trust indicator is physically connected directly to the trust evaluation device independent of a network connection.

18. The computer-readable storage medium of claim 9, wherein the trust indicator comprises one of a speaker, a buzzer or a scent generator that is connected directly to the trust evaluation device.

19. A computing device configured to provide a trustworthy indication of the integrity of a computer program, the computing device comprising:
- at least one processor configured to execute the computer program;
- a memory connected to the at least one processor storing the computer program;
- at least one trust indicator comprising a display that is visible on an external surface of a case and configured to identify the computer program; and
- a hardware trust evaluation module connected to the at least one processor and having the at least one trust indicator connected directly thereto, the at least one processor, memory, and the hardware trust evaluation module being contained within the case, the hardware trust evaluation module being configured to evaluate trustworthiness of the computer program based on a definition of trustworthiness provided by a user of the computing device that specifies a policy for the trust indicator to provide a positive indication of trust and a negative indication of trust and to provide a negative indication of the trustworthiness of the computer program by way of the trust indicator in response to determining that the computer program is not trustworthy.

20. The computing device of claim 19, wherein the computing device is further configured to restrict functionality in response to the hardware trust evaluation module determining that the computer program is not trustworthy.

21. The computing device of claim 20, wherein restricting functionality comprises one or more of removing data from the computing device, restricting access to one or more application programming interfaces provided by the computing device, terminating execution of the computer program, disabling one or more hardware components of the computing device, or disabling the computing device.

22. The computing device of claim 19, wherein the hardware trust evaluation module is further configured to provide a positive indication of the trustworthiness of the computer program by way of the trust indicator in response to determining that the computer program is trustworthy.

23. The computing device of claim 19, wherein the trust indicator comprises one or more lights that are visible on an external surface of the case.

24. The computing device of claim 19, further comprising a secondary trust indicator connected directly to the hardware trust evaluation module.

25. The computing device of claim 24, wherein hardware trust evaluation module is further configured to receive a request from a program executing on the processor to activate the secondary trust indicator and, in response to receiving the request, to activate the secondary trust indicator in response to a previous determination made by the hardware trust evaluation module that the program is trustworthy.

26. The computing device of claim 19, wherein the trust indicator further comprises a physical switch which, when activated, causes the hardware trust evaluation module to evaluate trustworthiness of a foreground computer program.

* * * * *